United States Patent [19]

Flora et al.

[11] Patent Number: 4,897,453

[45] Date of Patent: Jan. 30, 1990

[54] COMPATIBLE BLENDS OF POLYESTER-ETHERS AND POLYCARBONATES

[75] Inventors: Thomas E. Flora; Robert W. Seymour, both of Kingsport, Tenn.

[73] Assignee: Eastman Kodak Company, Rochester, N.Y.

[21] Appl. No.: 226,007

[22] Filed: Jul. 29, 1988

[51] Int. Cl.$^4$ .................... C08F 20/00; C08L 69/00
[52] U.S. Cl. .................... 525/439; 525/466
[58] Field of Search .................... 525/439, 466

[56] References Cited

U.S. PATENT DOCUMENTS

| | | | | |
|---|---|---|---|---|
| 4,125,572 | 11/1978 | Scott | .................... | 528/307 X |
| 4,188,314 | 2/1980 | Fox et al. | .................... | 260/37 |
| 4,348,469 | 9/1982 | Komiya | .................... | 430/55 |
| 4,391,954 | 7/1983 | Scott | .................... | 525/439 |
| 4,452,932 | 6/1984 | Banelle | .................... | 524/110 |
| 4,452,933 | 6/1984 | McCready | .................... | 524/217 |
| 4,461,877 | 7/1984 | Fox et al. | .................... | 525/439 |
| 4,532,290 | 7/1985 | Jaquiss | .................... | 524/417 |

FOREIGN PATENT DOCUMENTS 00150454 8/1985 European Pat. Off.
0097049 8/1978 Japan.

*Primary Examiner*—Theodore E. Pertilla
*Attorney, Agent, or Firm*—J. Frederick Thomsen; William P. Heath, Jr.

[57] ABSTRACT

Disclosed is a thermoplastic blend of a (1) polycarbonate and (2) a polyester-ether derived from 1,4-cyclohexanedicarboxylic acid, 1,4-cyclohexanedimethanol, poly(oxytetramethylene) glycol and, optionally, a polyfunctional compound. The blends possess a unique combination of properties, some of which are characteristic of compatible blends and others which are characteristic of incompatible blends.

9 Claims, No Drawings

COMPATIBLE BLENDS OF POLYESTER-ETHERS AND POLYCARBONATES

This invention relates to novel thermoplastic, moldable and/or extrudable compositions and, more particularly, to thermoplastic shapable blends of a polycarbonate and a polyester-ether based on 1,4-cyclohexanedicarboxylic acid, 1,4-cyclohexanedimethanol and poly(oxytetramethylene) glycol.

Polyester-ethers such as those described in U.S. Pat. No. 4,349,469 possess a combination of properties, including good melt strength and clarity, which renders them especially useful in molding or extruding articles having utility in the medical field. For example, such polyester-ethers may be extrusion blow molded to form bags useful for the packaging of medical fluids. The polyester-ethers also may be extruded into film or molded to form shaped articles useful as packaging materials or other devices designed for medical application where good optical clarity is essential. The economics of using the polyester-ethers disclosed in the above-cited patent could be improved if the polyester-ethers could be blended with another, more economical, polymeric material while retaining the desirable properties possessed by the polyester-ether.

Polycarbonates blended with various types of polyesters have been described in the patent literature such as the following representative U.S. patents:

| | |
|---|---|
| U.S. Pat. No. 4,125,572 | U.S. Pat. No. 4,188,314 |
| U.S. Pat. No. 4,391,954 | U.S. Pat. No. 4,452,932 |
| U.S. Pat. No. 4,532,290 | U.S. Pat. No. 4,452,933 |
| U.S. Pat. No. 4,461,877 | |

European Patent Application 150,454 discloses blends of a polycarbonate, a polyester-ether and, optionally, a poly(alkylene terephthalate) which are said to have improved tensile strength and high tear strength, tensile elongation and impact strength. The polyester-ether component is derived from butanediol, polytetramethylene glycol and dimethyl terephthalate. None of these patents discloses or contemplates blends of polycarbonates with the particular polyester-ethers used in the blends provided by our invention. Furthermore, the blends described in the literature do not possess the combination of properties essential for the end-uses decribed hereinabove.

The novel thermoplastic blends provided by our invention comprise (1) about 10 to 90 weight percent of a polycarbonate and (2) about 90 to 10 weight percent of a polyester-ether derived from 1,4-cyclohexanedicarboxylic acid, 1,4-cyclohexane-dimethanol and poly(oxytetramethylene) glycol. The blends are unique in that, while compatible from a thermodynamic point of view, they exhibit certain advantageous properties characteristic of incompatible blends. Thus, while the dependence of flexural modulus, flexural strength and tensile strength on blend composition is characteristic of incompatible systems, the excellent clarity and high tensile elongation of the blends is typical of compatible blends. A particulary unique feature of our novel blends is their clarity which is substantially greater than that of the polyester-ether alone. The blends containing larger amounts of polycarbonate may have uses similar to those indicated for the known polyester-polycarbonate blends. For example, the addition of the polyester-ether described hereinafter to a polycarbonate may improve processability without affecting detrimentally the good clarity and modulus of the polycarbonate.

The polycarbonate component of the blends may be branched or linear polycarbonates such as those described in U.S. Pat. Nos. 3,028,365, 3,334,154 and 3,915,926 in addition to those disclosed in the patent literature cited hereinabove. The polycarbonate component of our blends preferably is based on bisphenol-A and has an intrinsic viscosity of about 0.3 and 1.0 deciliters/gram, measured at 25° C. in methylene chloride. Suitable polycarbonates are commercially available under the tradenames Merion (Mobay Chemical), Lexan (General Electric) and Calibre (Dow Chemical).

The polyester-ether component of our blends are known polymers which may be derived from 1,4-cyclohexanedicarboxylic acid, 1,4-cyclohexanedimethanol and poly(oxytetramethylene) glycol as described in U.S. Pat. Nos. 3,023,192, 3,261,812, 3,651,014 4,003,882, and 4,221,703. Polyester-ethers derived from 1,4-cyclohexanedicarboxylic acid having a high trans isomer content, 1,4-cyclohexanedimethanol and poly-(oxytetramethylene) glycol having a molecular weight within a particular range are disclosed in U.S. Pat. No. 4,349,469. The polyester-ethers disclosed in the last-mentioned patent possess improved melt strength and clarity which renders them particularly useful for the manufacture of molded or extruded articles such as bags, bottles and film.

The polyester-ether component of our novel compositions has an inherent viscosity of about 0.8 to 1.5 and comprises:

(1) 1,4-cyclohexanedicarboxylic acid having a trans isomer content of at least 70, and preferably, at least 80 mole percent;

(2) a glycol component comprising:
   (a) 1,4-cyclohexanedimethanol, preferably having a trans isomer content of at least 60 mole percent; and
   (b) from about 15 to 50 weight percent, based on the weight of the polyester-ether, of poly(oxytetramethylene) glycol having a molecular weight of about 500 to 1100: and (3) from 0 to about 1.5 mole percent, based on the mole percent of the acid or glycol component, of a branching agent having at least three carboxyl and/or hydroxyl groups.

The polyester-ethers may be prepared according to known procedures such as those described in the patents cited hereinabove. The 1,4-cyclohexanedicarboxylic acid residue may be derived from either the diacid itself or from a polyester-ether-forming equivalent thereof auch as a dialkyl ester. The poly(oxytetramethylene) glycol component preferably has a molecular weight of about 1000 and preferably is used in an amount of from 20 to 35 weight percent, based on the weight of the polyester-ether.

The polyester-ether component may contain up to about 1.5 mole percent, based on the acid or glycol component, of the residue of a polyfunctional branching agent derived from a compound having at least three carboxyl and/or hydroxy groups. Examples of such compounds include trimellitic acid or anhydride, trimesic acid, trimethylolethane, trimethylolpropane, a trimer acid, etc.

The dicarboxylic acid component and glycol component each total 100 mole percent. Although the amount of poly(oxytetramethylene) glycol component is specified herein as a weight percent, the total mole percent of the cyclohexanedimethanol, poly(oxytetramethylene) glycol and polyol branching agent, if any, present is 100 mole percent.

The polyester-ether component may be modified with minor amounts, e.g., up to about 10 mole percent, of other glycols and dicarboxylic acids so long as the necessary or desired properties are not unduly affected. Example of such other glycols and diacids include alkylene glycols having from 2 to 10 carbon atoms such as, for example, ethylene glycol and propylene glycol, and aliphatic and aromatic dicarboxylic acids.

The molding/extrusion grade compositions provided by this invention are comprised of from about 10 to 90 weight percent of the polycarbonate component and from about 90 to 10 weight percent of the polyester-ether. Preferably, the polycarbonate component makes up about 30 to 90 weight percent of the compositions.

The compositions may be prepared according to known plastic melt-mixing procedures, for example, by melt extrusion using a single-screw or double-screw extruder.

As used herein, inherent viscosity (IV) is measured at 25° C. using 0.50 gram polymer per 100 mL of a solvent consisting of 60 weight percent phenol and 40 weight percent tetrachloroethane.

Our invention is further illustrated by the following examples.

EXAMPLES 1-3

Polyester-ether PCCE 9965 (Eastman Chemical Products, Inc.) and Merlon M40 polycarbonate (Mobay Chemical Corp.) were blended in weight ratios of 1:3 (Example 1), 1:1 (Example 2) and 3:1 (Example 3) by dry-mixing pellets and then extruding the pellet mixture from a single screw extruder. The PCCE 9965 had an inherent viscosity of 1.05 and consisted of 99.5 mole percent trans 1,4-cyclohexanedicarboxylic acid monomer units, 0.5 mole percent trimellitic anhydride monomer units, 1,4-cyclohexanedimethanol (70 mole percent trans isomer) monomer units and 25 weight percent, based on the weight of the polyester-ether, of poly(oxytetramethylene) glycol having a molecular weight of 1000. The PCCE 9965 contained 0.2 weight percent of Irganox 1010 stabilizer. Molded samples of the blends were prepared for determination of mechanical properties by injection-molding on a New Britain injection molding machine. Molded samples also were prepared from unmodified PCCE 9965 polyester-ether (Control Example 1) and from unmodified Merlon M40 polycarbonate (Control Example 2).

The IV (dl/g), before and after molding, and density (g/cc) of each composition was determined and the test samples molded from each composition were tested for tensile strength (psi) and elongation at break (%, ASTM D638), flexural modulus and strength (psi, ASTM D790) and Rockwell hardness (ASTM D785). The properties thus determined are set forth in the Table. The DSC values (C), determined using a Perkin-Elmer differential scanning calorimeter at a heating rate of 20° C./minute, for the compositions of each example are:

Example 1: Tg—106
Example 2: Tg—65
Example 3: Tg—28; Tm—183 (2nd cycle); Tch—86 (1st cycle), 127 (2nd cycle)
Control
Example 1: Tg—2; Tm—201 (1st cycle), 199 (2nd cycle); Tch—33 (2nd cycle)
Control
Example 2: Tg—150

TABLE

|  | EXAMPLES | | | CONTROL EXAMPLES | |
|---|---|---|---|---|---|
|  | 1 | 2 | 3 | 1 | 2 |
| I.V. Before Molding | 0.598 | 0.853 | 1.041 | 1.073 | 0.379 |
| I.V. After Molding | 0.539 | 0.709 | 0.798 | 1.020 | 0.310 |
| Density, g/ml | 1.183 | 1.162 | 1.151 | 1.127 | 1.198 |
| Tensile Strength at Yield, psi | 8,860 | 7,260 | 1,030 | 1,640 | 8,860 |
| Tensile Strength at Break, psi | 7,860 | 6,380 | 2,990 | 2,770 | 8.180 |
| Elongation at Break, % | 118 | 185 | 439 | 366 | 78 |
| Flexural Modulus, psi | 329,000 | 257,000 | 25,000 | 19,000 | 353,000 |
| Flexural Strength, psi | 14,590 | 11,890 | 1,000 | 1,520 | 15,200 |
| Rockwell Hardness R | 119 | 111 | Shore A 98 | Shore A 98 | 119 |
| L | 88 | 69 | Shore D 67 | Shore D 55 | 88 |

The 1/Tg values were determined for each of the five compositions of the Table using the well-known equation describing compatible polymer mixtures:

$$1/Tg = W_1/Tg_1 = W_1/Tg_2$$

in which Tg, $Tg_1$ and $Tg_2$ are the glass transition temperatures of the blend and the two components (1 and 2) which are present in weight fractions $W_1$ and $W_2$. When these values are plotted against the weight percent of polyester-ether present (from 0 to 100%) in the compositions, a straight line is obtained, indicating the blends of polyester-ether/polycarbonate are compatible. This unexpected result is further confirmed by the surprising clarity of the blends which exceeds the clarity of the polyester-ether control.

When the flexural and tensile values for each of the five compositions are plotted against the weight percent of polycarbonate present in each blend, "S"-shaped curves, characteristic of incompatible blends, are obtained. These compatible/incompatible characteristics of the novel blends described hereinabove are unexpected and can be quite desirable. For example, this behavior allows one to incorporate a reasonable level of polycarbonate into the polyester-ether to advantageously increase the latter's glass transition temperature without affecting substantially its modulus. Conversely, the polyester-ether may be incorporated into a polycarbonate to improve the latter's processability without detrimentally lowering its modulus or strength.

The invention has been described in detail with particular reference to preferred embodiments. thereof, but it will be understood that variations and modifications will be effected within the spirit and scope of the invention.

We claim:
1. A composition comprising a blend of:
   A. about 10 to 90 weight percent of a polycarbonate; and
   B. about 90 to 10 weight percent of a polyester-ether having an inherent viscosity of about 0.8 to 1.5 comprised of:
      (1) 1,4-cyclohexanedicarboxylic acid having a trans isomer content of at least 70;

(2) a glycol component comprising:
 (a) 1,4-cyclohexanedimethanol; and
 (b) from about 15 to 50 weight percent, based on the weight of the polyester-ether, of poly(oxytetramethylene) glycol having a molecular weight of about 500 to 1100: and
(3) from 0 to about 1.5 mole percent, based on the mole percent of the acid or glycol component, of a branching agent having at least three carboxyl, hydroxyl or both groups.

2. A composition according to claim 1 wherein the polycarbonate component is a bisphenol-A polycarbonate having an intrinsic viscosity of about 0.3 to 1.0 deciliters/gram measured at 25° C. in methylene chloride.

3. A composition according to claim 1 comprising a blend of:
 A. about 10 to 90 weight percent of a bisphenol-A polycarbonate having an intrinsic viscosity of about 0.3 to 1.0 deciliters/gram measured at 25° C. in methylene chloride; and
 B. about 90 to 10 weight percent of a polyester-ether having an inherent viscosity of about 0.8 to 1.5 comprised of:
  (1) 1,4-cyclohexanedicarboxylic acid having a trans isomer content of at least 80 mole percent;
  (2) a glycol component comprising:
   (a) 1,4-cyclohexanedimethanol having a trans isomer content of at least 60 mole percent; and
   (b) from about 20 to 35 weight percent, based on the weight of the polyester-ether, of poly(oxytetramethylene) glycol having a molecular weight of about 500 to 1100: and
  (3) from 0 to about 1.5 mole percent, based on the mole percent of the acid or glycol component, of a branching agent having at least three carboxyl, hydroxyl or both groups.

4. A composition comprising a blend of:
 A. about 30 to 90 weight percent of a bisphenol-A polycarbonate having an intrinsic viscosity of about 0.3 to 1.0 deciliters/gram measured at 25° C. in methylene chloride; and
 B. about 70 to 10 weight percent of a polyester-ether having an inherent viscosity of about 0.8 to 1.5 comprised of:
  (1) 1,4-cyclohexanedicarboxylic acid having a trans isomer content of at least 70 mole percent;
  (2) a glycol component comprising:
   (a) 1,4-cyclohexanedimethanol having a trans isomer content of at least 60 mole percent; and
   (b) from about 15 to 50 weight percent, based on the weight of the polyester-ether, of poly(oxytetramethylene) glycol having a molecular weight of about 500 to 1100: and
  (3) from 0 to about 1.5 mole percent, based on the mole percent of the acid or glycol component, of a branching agent having at least three carboxyl, hydroxyl or both groups.

5. A composition according to claim 4 wherein the glycol component of the polyester-ether comprises about 20 to 35 weight percent of the poly(oxytetramethylene) glycol.

6. A composition according to claim 1 comprising a blend of:
 A. about 30 to 90 weight percent of a bisphenol-A polycarbonate having an intrinsic viscosity of about 0.3 to 1.0 deciliters/gram measured at 25° C. in methylene chloride; and
 B. about 70 to 10 weight percent of a polyester-ether having an inherent viscosity of about 0.8 to 1.5 comprised of:
  (1) 1,4-cyclohexanedicarboxylic acid having a trans isomer content of at least 80 mole percent;
  (2) a glycol component comprising:
   (a) 1,4-cyclohexanedimethanol having a trans isomer content of at least 60 mole percent; and
   (b) from about 20 to 35 weight percent, based on the weight of the polyester-ether, of poly(oxytetramethylene) glycol having a molecular weight of about 1000: and
  (3) about 0.5 mole percent trimellitic anhydride.

7. A molded or extruded article of the composition of claim 1.

8. A molded or extruded article of the composition of claim 3.

9. A film of the composition of claim 3.

* * * * *